United States Patent
Kim et al.

(10) Patent No.: US 11,494,486 B1
(45) Date of Patent: Nov. 8, 2022

(54) CONTINUOUSLY HABITUATING ELICITATION STRATEGIES FOR SOCIAL-ENGINEERING-ATTACKS (CHESS)

(71) Applicant: HRL Laboratories, LLC, Malibu, CA (US)

(72) Inventors: Hyun (Tiffany) J. Kim, Irvine, CA (US); Rajan Bhattacharyya, Sherman Oaks, CA (US); Samuel D. Johnson, Santa Monica, CA (US); Soheil Kolouri, Agoura Hills, CA (US); Christian Lebiere, Pittsburgh, PA (US); Jiejun Xu, Diamond Bar, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 369 days.

(21) Appl. No.: 16/684,382

(22) Filed: Nov. 14, 2019

Related U.S. Application Data

(60) Provisional application No. 62/792,698, filed on Jan. 15, 2019.

(51) Int. Cl.
*G06F 21/55* (2013.01)
*G06N 5/02* (2006.01)

(52) U.S. Cl.
CPC .............. *G06F 21/554* (2013.01); *G06N 5/02* (2013.01); *G06F 2221/034* (2013.01)

(58) Field of Classification Search
CPC .... G06F 21/554; G06F 2221/034; G06N 5/02
See application file for complete search history.

(56) References Cited

U.S. PATENT DOCUMENTS 10,868,825 B1 * 12/2020 Dominessy ......... H04L 63/1433
11,102,244 B1 * 8/2021 Jakobsson ........... H04L 63/1483
(Continued)

OTHER PUBLICATIONS

Jaafor et al., Multi-layered graph-based model for social engineering vulnerability assessment. 2015 IEEE/ACM International Conference on Advances in Social Networks Analysis and Mining (ASONAM). Aug. 2015. p. 1480-1488 (Year: 2015).*

(Continued)

*Primary Examiner* — Carl G Colin
*Assistant Examiner* — Zhe Liu
(74) *Attorney, Agent, or Firm* — Tope-McKay & Associates

(57) ABSTRACT

Described is a system for continuously predicting and adapting optimal strategies for attacker elicitation. The system includes a global bot controlling processor unit and one or more local bot controlling processor units. The global bot controlling processor unit includes a multi-layer network software unit for extracting attacker features from diverse, out-of-band (OOB) media sources. The global controlling processing unit further includes an adaptive behavioral game theory (GT) software unit for determining a best strategy for eliciting identifying information from an attacker. Each local bot controlling processor unit includes a cognitive model (CM) software unit for estimating a cognitive state of the attacker and predicting attacker behavior. A generative adversarial network (GAN) software unit predicts the attacker's strategies. The global bot controlling processor unit and the one or more local bot controlling processor units coordinate to predict the attacker's next action and use the prediction to disrupt an attack.

15 Claims, 11 Drawing Sheets

(56) References Cited

U.S. PATENT DOCUMENTS

| | | | |
|---|---|---|---|
| 2019/0068632 A1* | 2/2019 | Foster | H04L 63/1441 |
| 2019/0166141 A1* | 5/2019 | Xu | G06N 20/00 |
| 2020/0005395 A1* | 1/2020 | Abdollahian | G06N 7/005 |
| 2020/0019863 A1* | 1/2020 | Dua | G06F 40/216 |
| 2020/0159997 A1* | 5/2020 | Wu | G06N 3/0481 |

OTHER PUBLICATIONS

Jaafor et al., Multi-Layered Graph-Based Model for Social Engineering Vulnerability Assessment. 2015, Aug. 2015 IEEE/ACM International Conference on Advances in Social Networks Analysis and Mining (ASONAM). p. 1480-1488 (Year: 2015).*

Shanthamallu et al., GrAMME: Semi-Supervised Learning using Multi-layered Graph Attention Models. Oct. 2018. ArXiv preprint arXiv:1810.01405. (Year: 2018).*

Shen et al., An Adaptive Markov Game Model for Cyber Threat Intent Inference. 2009, February. In: Theory and Novel Applications of Machine Learning. p. 317-334 (Year: 2009).*

M. Yee, S. Philips, G. R. Condon, P. B. Jones, E. K. Kao, S. T. Smith, C. C. Anderson and W. F. R., "Network discovery with multi-intelligence sources," Lincoln Laboratory Journal, vol. 20, 2013, pp. 31-46.

J. Chen, J. He, L. Cai and J. Pan, "Profiling Online Social Network Users via Relationships and Network Characteristics," in IEEE GLOBECOM, 2016, pp. 1-6.

N. Cesare, C. Grant and E. O. Nsoesie, Detection of User Demographics on Social Media: A Review of Methods and Recommendations for Best Practices, arXiv preprint arXiv:1702.01807, 2017, pp. 1-25.

Y. Liu and S. Chawla, "Social Media Anomaly Detection: Challenges and Solutions," in ACM WSDM, 2017, pp. 817-818.

Z. Chen, J. Yen, P. Liu, R. Erbacher, R. Etoty and C. Garneau, "ARSCA: a computer tool for tracing the cognitive processes of cyber-attack analysis," in CogSIMA, 2015, pp. 165-171.

Charles River Analytics, Sherlock, h t t p s : / / w w w.cra.com/work/case-studies/sherlock. Taken Jan. 20, 2020, pp. 1-4.

R. Compton, D. Jurgens and D. Allen, "Geotagging One Hundred Million Twitter Accounts with Total Variation Minimization," in IEEE International Conference on Big Data (IEEE BigData), Washington D.C, 2014, pp. 393-401.

P. Li, J. Xu and T.-C. Lu, "Leveraging Homophily to Infer Demographic Attributes.," in Workshop on Information in Networks, New York, 2015, pp. 1-5.

L. Cruz-Albrecht, J. Xu, K.-Y. Ni and T.-C. Lu, "Characterizing Regional and Behavioral Device Variations Across the Twitter Timeline: a Longitudinal Study," in ACM Web Science Conference (WebSci), Troy, 2017, pp. 279-288.

J. Xu and T.-C. Lu, "Toward Precise User-Topic Alignment in Online Social Media.," in IEEE International Conference an Big Data (IEEE BigData), Santa Clara, CA, 2015, pp. 767-775.

J. Xu, S. Johnson and K.-Y. Ni, "Cross-Modal Event Summarization: A Network of Networks Approach," in IEEE International Conference on Big Data (IEEE BigData), Washington D.C., 2016, pp. 1653-1657.

M. C. Lovett, L. M. Reder and C. Lebiere, Modeling Workign Memory in a Unified Architecture: An ACT-R Perspective, A. Miyake and P. Shah, Eds., New York: Cambridge University Press, 1999, pp. 135-182.

M. C. Lovett, L. M. Reder and C. Lebiere, "Modeling Working Memory in a Unified Architecture: An ACT-R Perspective," in Models of Working Memory, A. Miyake and P. Shah, Eds., Cambridge University Press, 1999, pp. 135-182.

S. Chelian, J. Paik, P. Pirolli, C. Lebiere and R. Bhattacharyya, "Reinforcement learning and instance-based learning approaches to modeling human decision making in a prognostic foraging task," in ICDL-EpiRob, 2015, pp. 116-122.

R. L. West and C. Lebiere, "Simple games as dynamic, coupled systems: Randomness and other emergent properties," Cognitive Systems Research, vol. 1, No. 4, pp. 221-239, 2001.

K. Sycara, C. Lebiere, Y. Pei, D. Morrison, Y. Tang and M. Lewis, "Abstraction of Analytical Models from Cognitive Models of Human Control of Robotic Swarms," in 113th International Conference on Cognitive Modeling (ICCM), Groningen, NL, 2015, pp. 1-6.

C. Gonzalez, F. J. Lerch and C. Lebiere, "Instance-based learning in real-time dynamic decision making," Cognitive Science, vol. 27, No. 4, pp. 591-635, 2003.

D. Reitter and C. Lebiere, "Social cognition: Memory decay and adaptive information filtering for robust information maintenance," in 26th AAAI Conference on Artificial Intelligence (AAAI-12), 2012, pp. 1-7.

Wikipedia, "Liar's Dice," h t t p s : / / en.wikipedia.org/wiki/Liar%27s_dice. Taken Jan. 20, 2020.

A. Gohsh, B. Bhattacharya and S. B. Chowdhury, SAD-GAN: Synthetic Autonomous Driving using Generative Adversarial Networks, arXiv preprint arXiv:1611.08788, 2016, pp. 1-5.

E. S. a. G. Hotz, Learning a driving simulator, arXiv preprint arXiv:1608.01230, 2016, pp. 1-8.

D. Pfau and O. Vinyals, Connecting generative adversarial networks and actor-critic methods, arXiv preprint arXiv:1610.01945, 2016, pp. 1-10.

R. Yeh, C. Chen, T. Y. Lim, A. G. Schwing, M. Hasegawa-Johnson and M. N. Do, "Semantic Image Inpainting with Deep Generative Models," in IEEE Conference on Computer Vision and Pattern Recognition, 2017, pp. 6882-3890.

"Agari Advanced Threat ProtectionTM," https://www.agari.com/products/advanced-threat-protection/, taken Jan. 13, 2020.

* cited by examiner

Each game is modeled as a state-machine, which is conditioned on the intended action, as well as the cognitive state of the attacker.

CONTINUOUSLY HABITUATING ELICITATION STRATEGIES FOR SOCIAL-ENGINEERING-ATTACKS (CHESS)

CROSS-REFERENCE TO RELATED APPLICATIONS

This application claims the benefit of and is a non-provisional patent application of U.S. Provisional Application No. 62/792,698, filed on Jan. 15, 2019, the entirety of which is hereby incorporated by reference.

GOVERNMENT RIGHTS

This invention was made with government support under U.S. Government Contract Number FA8650-18-C-7877, awarded by AFRL/DARPA. The government has certain rights in the invention.

BACKGROUND OF INVENTION

(1) Field of Invention

The present invention relates to a system for continuously predicting and adapting optimal strategies for attacker elicitation and, more specifically, to a system for continuously predicting and adapting optimal strategies for attacker elicitation by identifying the attacker's intent and strategy to predict the attacker's responding actions.

(2) Description of Related Art

Prior approaches for information inference and elicitation tend to heavily rely on the Out-Of-Band (OOB) information extraction only, as described in Literature Reference Nos. 1-4 of the List of Incorporated Literature References. These prior approaches suffer from poor accuracy and scalability with respect to the network size. Furthermore, cognitive modeling has been extensively applied to cyber defense (see Literature Reference Nos. 5-6), but has not been developed for social engineering attackers.

Thus, a continuing need exists for a system that addresses the aforementioned pitfalls to elicit information from cyber attackers.

SUMMARY OF INVENTION

The present invention relates to a system for continuously predicting and adapting optimal strategies for attacker elicitation and, more specifically, to a system for continuously predicting and adapting optimal strategies for attacker elicitation by identifying the attacker's intent and strategy to predict the attacker's responding actions. The system comprises a global bot controlling processor unit in communication with one or more local bot controlling processor units, wherein each local bot controlling processor unit is specific for an attacker-victim relationship. The global bot controlling processor unit comprises a multi-layer network (MLN) software unit configured to extract attacker features from diverse, out-of-band (OOB) media sources; an adaptive behavioral game theory (GT) software unit configured to determine a best strategy for eliciting identifying information from an attacker. Each local bot controlling processor unit comprises a cognitive model (CM) software unit configured to estimate a cognitive state of the attacker and predict attacker behavior; and a generative adversarial network (GAN) software unit configured to predict the attacker's strategies, wherein the GAN software unit comprises a set of GANs. In coordination, the global bot controlling processor unit and the one or more local bot controlling processor units are configured to predict the attacker's next action and use the prediction to disrupt an attack by the attacker.

In another aspect, the MLN software unit comprises a plurality of layers and nodes and edges within each layer, wherein each layer in the MLN software unit represents a distinct type of attacker feature such that identification of inter-layer links and intra-layer links are used to characterize the attacker.

In another aspect, the GT software unit is configured to monitor and interact with each local bot controlling processor unit to assign strategies to maximize a utility gain of acquiring the attacker's identifying information.

In another aspect, the CM software unit is configured to generate a plurality of cognitive profiles for the attacker and output the plurality of cognitive profiles to the GAN software unit.

In another aspect, each GAN software unit is a neural network trained to model the attacker's next action in a specific game, wherein input to each GAN software unit is a current action of the attacker, the cognitive state of the attacker as estimated from the CM software unit, and an intended action, and wherein each GAN software unit outputs a probability of a next action of the attacker.

In another aspect, a message is transmitted to the attacker that aims to elicit identifiable information about the attacker in order to disrupt the attack.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
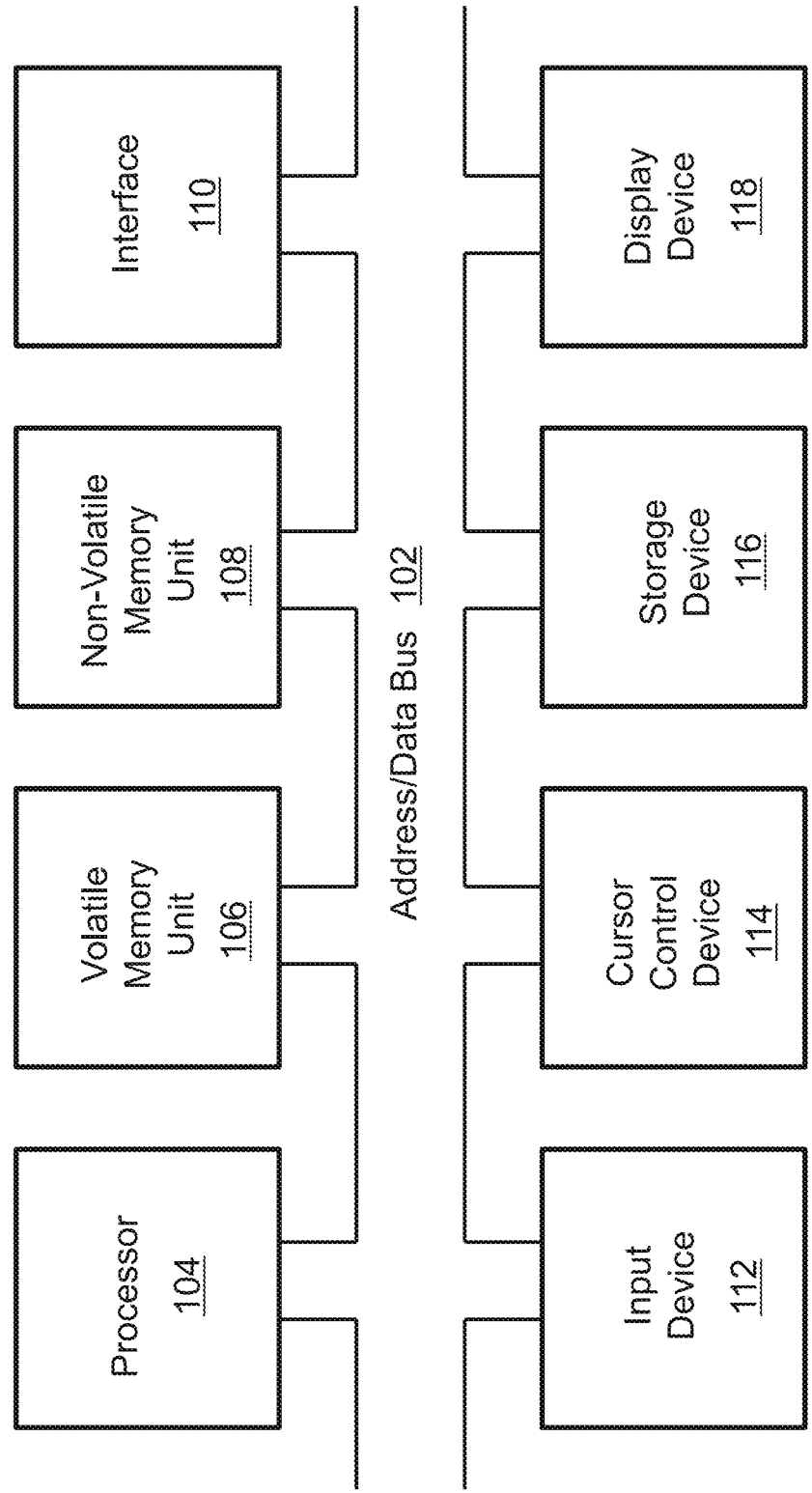
FIG. 1 is a block diagram depicting the components of a system according to various embodiments of the present disclosure.

The present invention relates to a system for continuously predicting and adapting optimal strategies for attacker elicitation and, more specifically, to a system for continuously predicting and adapting optimal strategies for attacker elicitation by identifying the attacker's intent and strategy to predict the attacker's responding actions.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. M. Yee, S. Philips, G. R. Condon, P. B. Jones, E. K. Kao, S. T. Smith, C. C. Anderson and W. F. R., "Network discovery with multi-intelligence sources," *Lincoln Laboratory Journal*, vol. 20, 2013.
2. J. Chen, J. He, L. Cai and J. Pan, "Profiling Online Social Network Users via Relationships and Network Characteristics," in *IEEE GLOBECOM*, 2016.
3. N. Cesare, C. Grant and E. O. Nsoesie, *Detection of User Demographics on Social Media: A Review of Methods and Recommendations for Best Practices*, arXiv preprint arXiv:1702.01807, 2017.
4. Y. Liu and S. Chawla, "Social Media Anomaly Detection: Challenges and Solutions," in *ACM WSDM*, 2017.
5. Z. Chen, J. Yen, P. Liu, R. Erbacher, R. Etoty and C. Garneau, "ARSCA: a computer tool for tracing the cognitive processes of cyber-attack analysis," in *CogSIMA*, 2015.
6. Charles River Analytics, Sherlock, https://www.cra.com/work/case-studies/sherlock.
7. R. Compton, D. Jurgens and D. Allen, "Geotagging One Hundred Million Twitter Accounts with Total Variation Minimization," in *IEEE International Conference on Big Data (IEEE BigData)*, Washington D.C., 2014.
8. P. Li, J. Xu and T.-C. Lu, "Leveraging Homophily to Infer Demographic Attributes.," in *Workshop on Information in Networks*, New York, 2015.
9. L. Cruz-Albrecht, J. Xu, K.-Y. Ni and T.-C. Lu, "Characterizing Regional and Behavioral Device Variations Across the Twitter Timeline: a Longitudinal Study," in *ACM Web Science Conference (WebSci)*, Troy, 2017.
10. J. Xu and T.-C. Lu, "Toward Precise User-Topic Alignment in Online Social Media.," in *IEEE International COnference on Big Data (IEEE BigData)*, Santa Clara, Calif., 2015.
11. J. Xu, S. Johnson and K.-Y. Ni, "Cross-Modal Event Summarization: A Network of Networks Approach," in *IEEE International Conference on Big Data (IEEE BigData)*, Washington D.C., 2016.
12. M. C. Lovett, L. M. Reder and C. Lebiere, Modeling Workign Memory in a Unified Architecture: An ACT-R Perspective, A. Miyake and P. Shah, Eds., New York: Cambridge University Press, 1999.
13. M. C. Lovett, L. M. Reder and C. Lebiere, "Modeling Working Memory in a Unified Architecture: An ACT-R Perspective," in *Models of Working Memory*, A. Miyake and P. Shah, Eds., Cambridge University Press, 1999, pp. 135-182.
14. S. Chelian, J. Paik, P. Pirolli, C. Lebiere and R. Bhattacharyya, "Reinforcement learning and instance-based learning approaches to modeling human decision making in a prognostic foraging task," in *ICDL-EpiRob*, 2015.

15. R. L. West and C. Lebiere, "Simple games as dynamic, coupled systems: Randomness and other emergent properties," *Cognitive Systems Research*, vol. 1, no. 4, pp. 221-239, 2001.

16. K. Sycara, C. Lebiere, Y. Pei, D. Morrison, Y. Tang and M. Lewis, "Abstraction of Analytical Models from Cognitive Models of Human Control of Robotic Swarms," in 113*th International Conference on Cognitive Modeling (ICCM)*, Groningen, N L, 2015.

17. C. Gonzalez, F. J. Lerch and C. Lebiere, "Instance-based learning in real-time dynamic decision making," *Cognitive Science*, vol. 27, no. 4, pp. 591-635, 2003.

18. D. Reitter and C. Lebiere, "Social cognition: Memory decay and adaptive information filtering for robust information maintenance," in 26*th AAAI Conference on Artificial Intelligence (AAAI-*12), 2012.

19. Wikipedia, "Liar's Dice," https://en.wikipedia.org/wiki/Liar %27s_dice.

20. A. Gohsh, B. Bhattacharya and S. B. Chowdhury, *SAD-GAN.: Synthetic Autonomous Driving using Generative Adversarial Networks*, arXiv preprint arXiv: 1611.08788, 2016.

21. E. S. a. G. Hotz, *Learning a driving simulator*, arXiv preprint arXiv:1608.01230, 2016.

22. D. Pfau and O. Vinyals, *Connecting generative adversarial networks and actor-critic methods*, arXiv preprint arXiv:1610.01945, 2016.

23. R. Yeh, C. Chen, T. Y. Lim, A. G. Schwing, M. Hasegawa-Johnson and M. N. Do, "Semantic Image Inpainting with Deep Generative Models," in *IEEE Conference on Computer Vision and Pattern Recognition*, 2017.

(2) PRINCIPAL ASPECTS

Various embodiments of the invention include three "principal" aspects. The first is a system for continuously predicting and adapting optimal strategies for attacker elicitation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
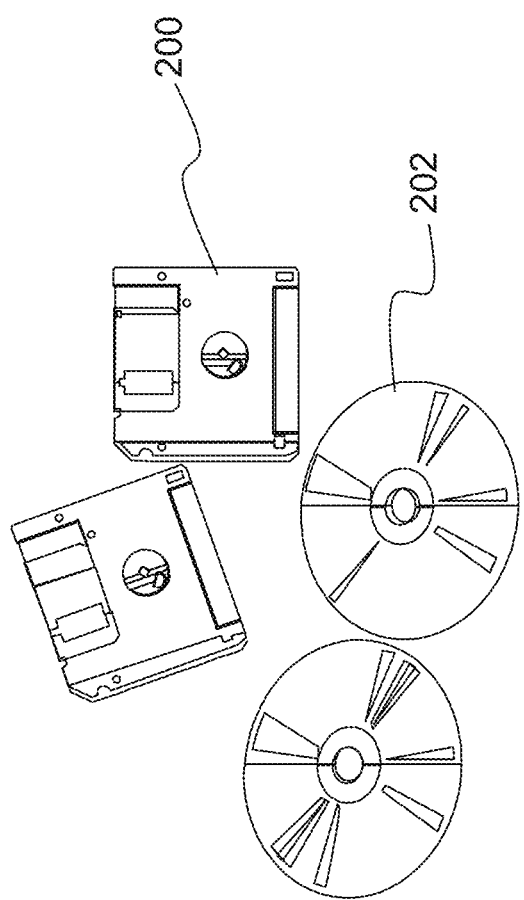
FIG. 2 is an illustration of a computer program product embodying an aspect of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Described herein is an interactive system, referred to as Continuously Habituating Elicitation Strategies for Social-Engineering-Attacks (CHESS), that continuously predicts and adapts optimal strategies for attacker elicitation. CHESS elicits a hidden attacker's identifying information by: 1) mining from diverse, out-of-band (OOB) media sources using unique multi-layer networks (MLN); and 2) engaging the attacker in an optimal interactive strategy by learning and predicting the evolving future behavior of the attacker with precise cognitive models, generative adversarial networks, and game theory (GT) simulations. Even without specific adversarial behavior data, especially for previously unseen, advanced, or personalized attacks, CHESS continuously evolves and learns online as interactions occur. The precise attacker's behavior and strategy prediction simulation frameworks empower the GT engine to maximize the utility gain of acquiring the attacker's identifying information while minimizing the penalty in terms of the resource usage and the number of interactions.

Prior approaches for information inference and elicitation tend to heavily rely on the OOB information extraction only (see Literature Reference Nos. 1-4) and suffer from poor accuracy and scalability with respect to the network size. Cognitive modeling has been extensively applied to cyber defense (see Literature Reference Nos. 5-6), but has not been developed for social engineering attackers. Leveraging extensive expertise and experience in online and social media analytics and network alignment, cognitive modeling and sensemaking and psychological learning for human-performance prediction in complex decision-making systems, CHESS addresses the aforementioned pitfalls and the core technical challenges of eliciting information from cyber attackers with several innovations.

First, since the attacker information is highly limited and likely to be bogus/impersonated throughout the interactions, MLN extract the attacker features using OOB data from open-source intelligence. Second, since the attacker's true reasoning abilities are unknown and observations are limited, an evolving attacker Cognitive Model (CM) tracks and exploits attacker's cognitive states and continuously evolves per interaction to predict attacker behavior for both known and unknown attack types. Third, since the attacker's true game strategies are unknown, Generative adversarial networks (GANs) simulate attacker's strategies and actions. Fourth, to elicit the identifying information from the attacker while keeping him/her engaged, an Adaptive Behavioral Game Theory module simultaneously interacts with CM and GANs to determine the best strategy, including optimized resource usage and dialog turns by coordinating bots to interact with a potentially ambiguous attacker. As the interactions evolve with the attackers, all modules continuously learn from their decisions to increase accuracy. Each of these aspects will be described in detail below.

(4) SPECIFIC DETAILS OF VARIOUS EMBODIMENTS

Figure 3:
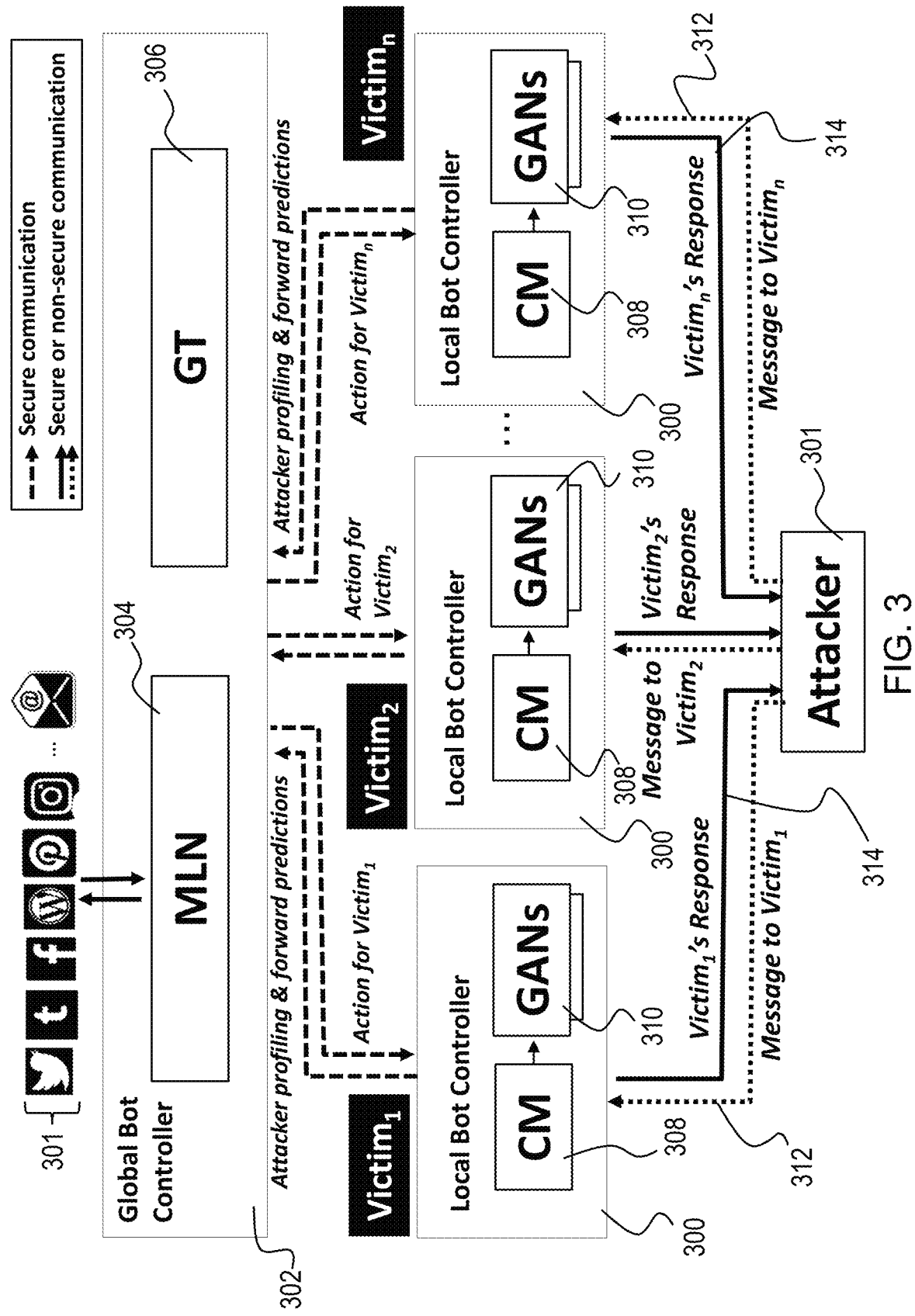
FIG. 3 is an illustration of a Continuously Habituating Elicitation Strategies for Social-Engineering-Attacks (CHESS) architecture according to some embodiments of the present disclosure.

For direct and indirect elicitation of attacker's identifying information, the prominent challenge is identifying the attacker's intent and strategy to predict the attacker's responding actions. To address this challenge, the overall CHESS system is composed of two controllers as shown in FIG. 3: one or more local bot controllers (element 300) and a global bot controller (element 302). A local bot controller (element 300) is specific for the dedicated attacker-victim relationship and creates a simulation environment for the particular attacker character, since the same attacker can possibly pretend to be different characters. To prescribe the optimal strategies among multiple local bot controllers and their available resources, the global bot controller (element 302) observes the attacker features from multiple bots and simulates interactions with the local bot controllers (element 300) to coordinate their responses to optimize the use of resources and elicitation. As will be described in detail below, CM (element 308) and GANs (element 310) are specific to the attacker's cognitive features and game for the particular victim and, hence, reside in each local bot controller (element 300). MLN (element 304) and GT (element

306) in the global bot controller (element 302) observe and maintain a global view to build accurate attacker profiles and to prescribe the optimal strategies by coordinating bots.

(4.1) Global Bot Controller (Element 302)

The global bot controller (element 302) comprises (1) the Multi-Layer Networks (MLN) module (element 304) to extract attacker features from OOB media sources (element 301) from open-source intelligence, and (2) the Adaptive Behavioral Game Theory (GT) module (element 306) that determines the best strategy for elicitation while optimizing the resources and dialog turns with the unknown attacker environment while keeping the attacker engaged. Based on the messages (i.e., internal outputs between local bot controllers (element 300) and the global bot controller (element 302)) repeatedly forwarded by local bot controllers (element 300), MLN (element 304) builds and updates the global view of the attacker features (e.g., demographics (e.g., age, gender), intent (e.g., acquiring personally identifiable information), building trust, topics of interest (e.g., hobbies), sentiment (e.g., positive/negative) using multi-layer networks, infers missing information, and shares the results with the local bot controllers (element 300). While MLN (element 304) acts as a foundational data analysis tool, GT (element 306) is the decision maker that repeatedly interacts with the local bot controllers (element 300) to forward-simulate the attacker responses given victims' potential actions, and coordinates the ultimate strategy for each bot (e.g., request additional information from attacker, agree to provide the bank account resource). By coordinating inputs from and outputs to the attacker (element 301) using MLN (element 304) and GT (element 306), respectively, CHESS optimizes the information gained from the attacker (element 301), the number and types of resources used, as well as the number of interactions.

(4.2) Local Bot Controller (Element 300)

Each local bot controller (element 300) comprises an Evolving Attacker Cognitive Model (CM) module (element 308) that tracks and exploits the attacker's cognitive states and continuously evolves to predict attacker behavior for both known and unknown attack types. Each local bot controller (element 300) also comprises a Generative adversarial networks (GANs) module (element 310) that predicts the attacker's game structure and strategies (e.g., (spear)-phishing for financial, credential, or espionage purposes, long-term trust-based spear-phishing vs. short-term phishing). Based on the attacker features analyzed by the MLN (element 304) in the global bot controller (element 302), CM (element 308) generates the attacker's cognitive profiles, such as aggressiveness, trust, cognitive bias/rationality, depth of processing, etc., and forwards them to GANs (element 310). Since the attacker's game and strategies rely on the attacker features and cognitive profiles, GANs (element 310) utilize information from MLN (element 304) and CM (element 308), and predicts the attacker's next move in the game according to the prescribed action from GT (element 306) in the global bot controller (element 302). Consequently, the output moves from GAN (element 310) help GT (element 306) in the global bot controller (element 302) to assign optimal strategy for elicitation with optimized resource usage while keeping the attacker engaged.

(4.3) Multi-Layer Networks (MLN) Module (Element 304)

The MLN (element 304) constructs a profile of the hidden attacker from identifying features, such as demographics, geographic location, topics of interest, and intents, using out-of-band (OOB) information. The main challenge is the lack of information for CHESS bots to characterize the attackers from the limited initial communication. This challenge is addressed in a progressive manner that builds on an initial construction of a unique Multi-Layer Networks (MLN) (element 304) representation based on historical data related to online social engineering attacks. The data covers a wide range of areas, such as online social media, email records, and databases of malicious activities. Such a model provides an effective mechanism to abstract and embed multimodal attacker feature information into a unified space for subsequent inference.

(4.3.1) MLN Representation

Figure 4:
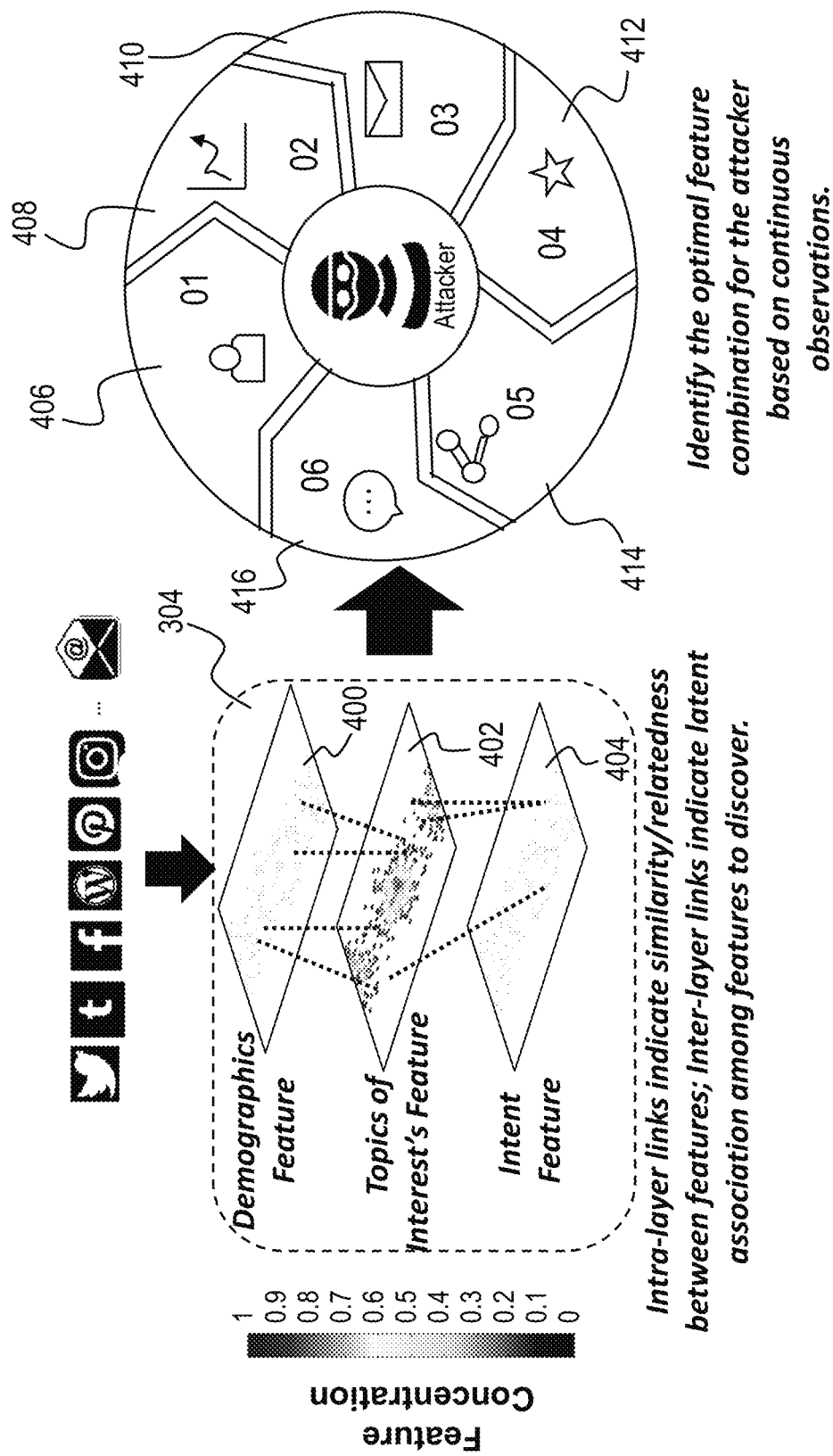
FIG. 4 is an illustration of operations of a multi-layer network (MLN) module according to some embodiments of the present disclosure.

FIG. 4 illustrates the MLN (element 304) identifying attacker's hidden features (attributes) by optimally exploring the joint feature embedding space learned from massive historical data on a wide range of social engineering attacks. Each layer in the MLN (element 304) represents a particular type of feature attribute. For example, as shown in FIG. 4, the MLN (element 304) is comprised of a demographics feature layer (element 400), a topics of interest's feature layer (element 402), and an intent feature layer (element 404). Nodes and edges are defined in a heterogeneous manner from one layer to another. The idea is to construct a network for each layer and accurately reflect the similarity and relatedness of the corresponding feature characteristics. For instance, demographics information can often be captured and revealed by mutual interactions among online users (see Literature Reference Nos. 7-9) in the demographics feature layer (element 400). In such a network, nodes represent specific demographic attributes and edges indicate (frequent) interactions among users with the corresponding demographic attributes.

Similarly, an intent network can be constructed in a different layer (i.e., the intent feature layer (element 404)), where nodes represent messages from the attackers and edges represent message content similarities. Links that are across layers measure the association between different feature attributes. For instance, attacks with similar intents may be highly relevant to a demographic or geographic region, such as the Nigeria email scam. The cross-layer links can be obtained initially from historical data, and augmented further by exploration of the hidden correlation among different attribute networks (see Literature Reference Nos. 10-11). Optimal node association across networks will be learned using an optimization framework. Essentially, the MLN (element 304) approximates the attacker's hidden attribute space to connect highly relevant features.

As depicted in FIG. 4, the optimal feature combination for the attacker can be identified based on continuous observations of information related to the attacker, non-limiting examples of which include attacker demographics (element 406), pattern of life (element 408), attacker's email address(es) (element 410), social media accounts (element 412), social network structure (e.g., friends) (element 414), and phone numbers/SMS messages (element 416).

(4.3.2) Procedure

Depending on the communication with the attacker, CHESS will start with the appropriate layers to query MLN (element 304), a component/module inside CHESS, for additional feature attributes of the attackers. When CHESS gets an input (e.g., message from an attacker), CHESS forwards the input to the MLN (element 304), which attempts to extract hidden attributes about the attacker. Specifically, CHESS will first identify a set of seed nodes in the MLN (element 304) based on the initially obtained information, which could be the set of nodes representing messages that are most similar based on the current communication with the attackers. Once these seed nodes are identified, the next step is to discover a set of inter-connected nodes that are most relevant to the seeds. For example, MLN (element 304) may infer the location from the initial message to be the African continent, and later enhance location accuracy as interactions continue. Such discovery will be done by solving an optimization problem in finding nodes that would maximize some forms of a fitness function (e.g., sum of the node centrality values from each layer). Analogous to the concept of "personality trait", the set of connected nodes ultimately represent feature attributes that, collectively, characterize the attacker.

(4.4) Evolving Attacker Cognitive Model (CM) Module (Element 308)

The Evolving Attacker Cognitive Model (CM) (element 308) estimates the cognitive state of the attacker during the attacker's interactions with CHESS. This is key for CHESS agents (i.e., systems that run CHESS) to forward-simulate (i.e., simulate in advance how the game will play between the attacker and the victim) the continued interactive game play in conjunction with the GAN (element 310) and GT (element 306) modules. The CM (element 308) builds multiple cognitive profiles (e.g., FIGS. 5A and 5B, element 504) that include 1) task related information (e.g., different attacker's goals, tactics, techniques, and procedures (TTPs), current beliefs in game play or trust in the interaction), and 2) cognitive phenotype. Cognitive phenotypes (characteristics) vary based on the level of aggressiveness, trust on victim, deceitfulness, rationality, depth of processing/thinking, and cognitive workload. For example, an attacker may be very aggressive in asking a victim to provide personal information with a low level of trust on the victim and high deceitfulness and irrationality without thinking much in advance due to an incapability to handle a high cognitive workload. Through interaction with the attacker, the CM (element 308) refines its estimation and outputs the cognitive profile to the GAN (element 310) to enhance its prediction of the attacker's next action. Non-limiting examples of actions taken by CHESS include (1) comply honestly vs. dishonestly; (2) engage with the attacker to waste time vs. to build trust; (3) request information or action; (4) ignore; (5) challenge the attacker to disengage; (6) deny attacker's request; and (7) request handoff.

Several challenges exist in deploying the CM (element 308): 1) there is limited data from interactions with the attacker; 2) attackers have different cognitive profiles underlying their behavior; 3) high complexity exists in cognitive state estimation due to deceptive behavior; and 4) CMs (element 308) must be efficient and scalable for deployment in CHESS agents. These challenges are addressed sequentially. First, the CM (element 308) is built from ACT-R, a state-of-art (SOA) cognitive model that has been validated in thousands of studies of cognition and behavior. Carnegie Mellon University (CMU) had initially developed ACT-R for use in cognitive tutoring applications (see Literature Reference No. 12), where the cognitive model of the student must be estimated from limited interaction with the tutor computer interface. Cognitive principles embedded in the architecture greatly constrain the set of possible models and limit the data requirements. Second, the cognitive profile of the attacker includes fundamental cognitive factors, such as the "depth of processing," which relates to working memory capacity and other cognitive traits, previously modeled by CMU (see Literature Reference No. 13). Another critical aspect is modeling the attacker's cognitive bias, or irrationality that influence their decisions, which has been previously simulated in studies of cognitive bias, with 90% modeling accuracy (see Literature Reference No. 14).

Third, to maintain tractability of attacker cognitive states, an ontology of attacker playbooks (tactics, techniques, and procedures (TTPs) in Phase 1) is developed for initial attribution, then refine the attacker's profile through interaction. This attribution includes an estimation of attacker engagement with the system. By modulating engagement (through techniques such as intermittent credentialing), it is possible to promote the acceptance of deceptive information and to reduce confidence in exfiltrated information. Fourth, the architectural mechanisms and knowledge upon which they operate can be embedded in scalable efficient toolkit implementations of ACT-R that abstract away unneeded complexity and make it easier to embed cognitive models in large software modules (see Literature Reference No. 15).

(4.4.1) ACT-R Architecture

Figure 5A:
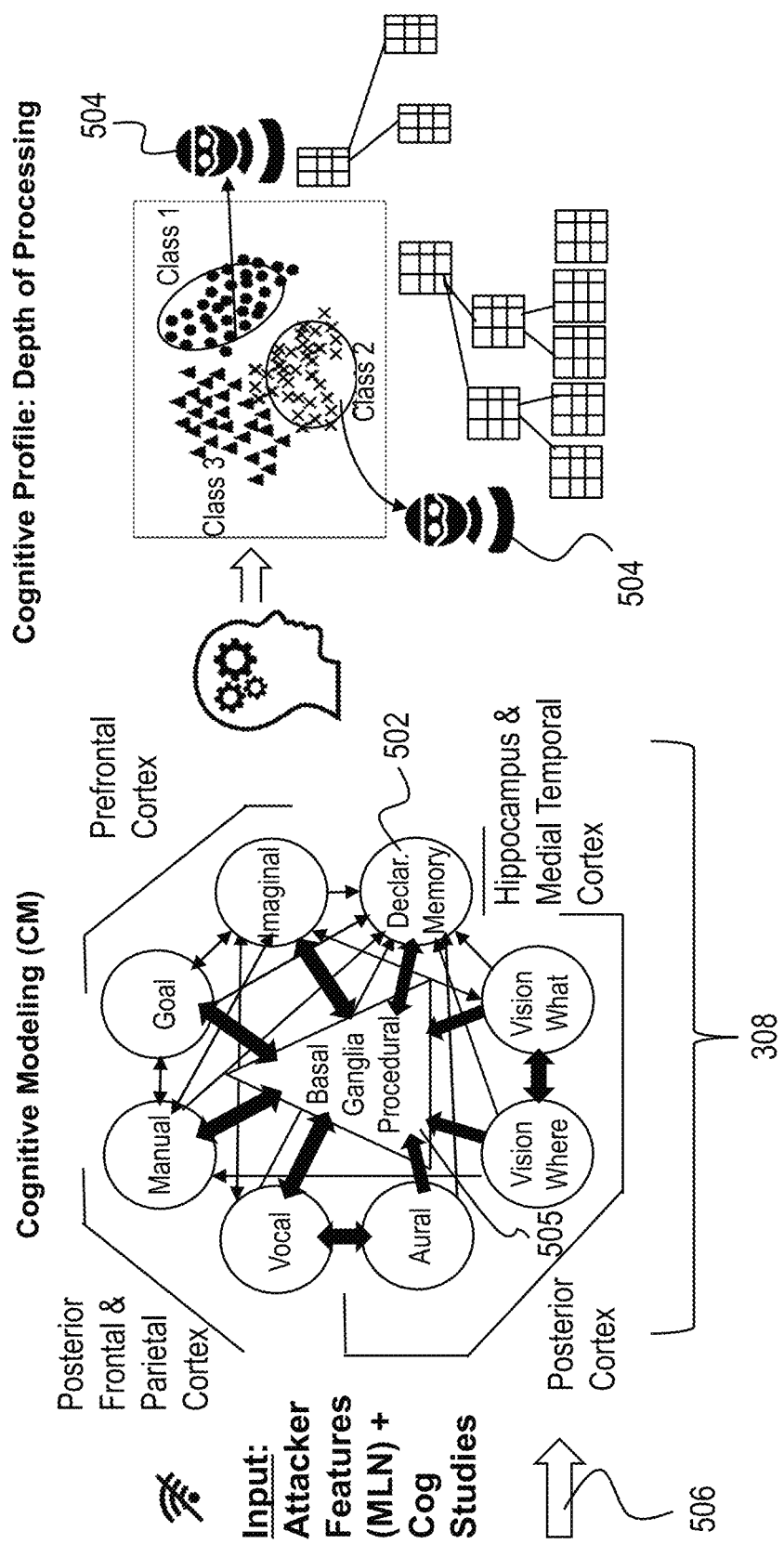
FIG. 5A is an illustration of construction of a cognitive model (CM) module according to some embodiments of the present disclosure.

As depicted in FIG. 5A, the CM (element 308) is initially constructed using ACT-R to create cognitive profiles (element 504). An important aspect of the cognitive profile (element 504) includes depth of processing, which depends on working memory capacity of cognition. This affects the ability to internally simulate the number of turns of game play. The ACT-R architecture is modular, corresponding to functional sub-components in the brain (e.g., posterior cortex, prefrontal cortex), as shown in FIG. 5A. In one embodiment, the focus is on two fundamental modules: a declarative memory (element 502) and procedural memory (element 505), and their interface in the form of working memory. Each module has mechanisms and parameters that model cognitive functions that can be assembled into different cognitive profiles (element 504).

During the CHESS operation, information from the bot's interactions enters the working memory of the attacker's cognitive model. An important aspect to modeling working memory is its capacity, whose limitations fundamentally impact the complexity of cognitive reasoning available to attackers (see Literature Reference No. 16). During operation, information from working memory provides the context to retrieve associated information stored in the declarative memory module (element 502). The retrieval models the attacker's situational assessment of the state of the game. Based on that information, the procedural system (element 505) deliberates on and chooses among courses of actions (i.e., potential responses). The opportunity for a coordinated strategy of multiple victim bots on a single attacker can exploit their working memory capacity, and, hence, depth of processing.

(4.4.2) Procedure

Building the CM (element 308) requires several stages. First, the CM (element 308) initializes declarative (element 502) and procedural (element 505) memory systems with an initial set of training data representing previous experience and strategies (i.e., input data (element 506)). The second stage of training involves running the CM (element 308) and tuning parameters to best match the attacker data (i.e., input data (element 506)). Tuning parameters include architectural parameters for the cognitive model, such as chunk activation noise, decay rate, and mismatch penalty, in addition to multiple other parameters that exist in embodiments for the cognitive model and are not exhaustively listed but can be implemented by one skilled in the art of cognitive modeling.

Figure 5B:
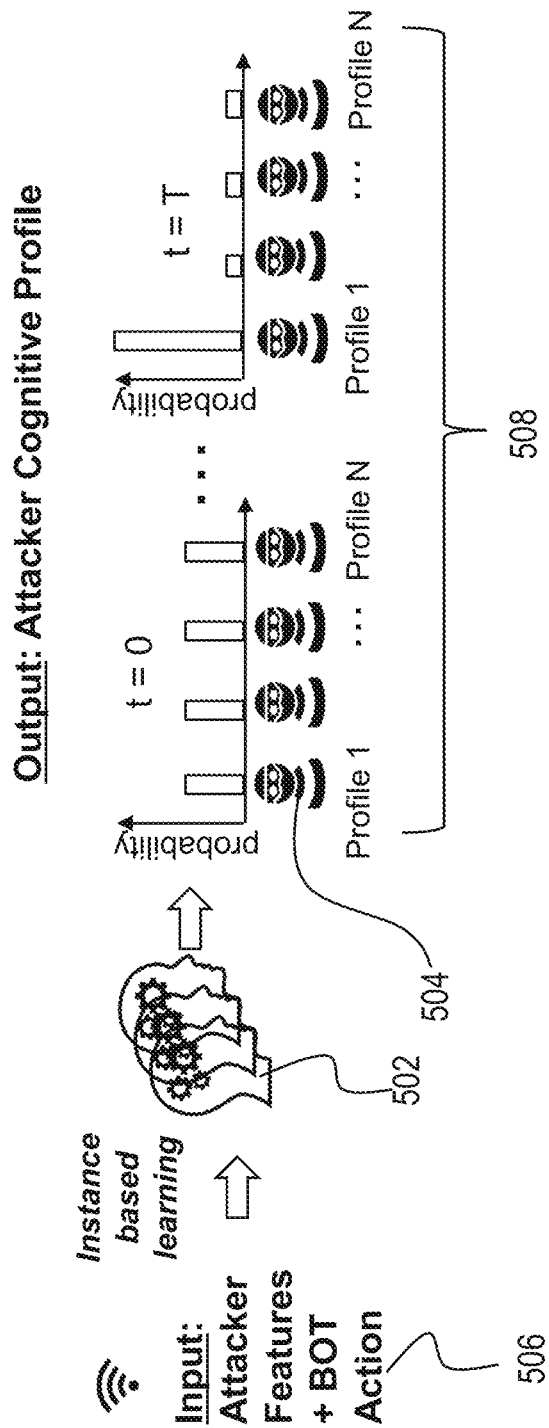
FIG. 5B is an illustration of the CM module simulating multiple cognitive profiles in CHESS according to some embodiments of the present disclosure.

In the CM (element 308), multiple models are concurrently run with different sets of knowledge and strategies to iteratively isolate the best matching profile to the attacker interactions. FIG. 5B illustrates an input (element 506) consisting of attacker features (which includes the actual attacker's real responses) and the action of the defender BOT. The input (element 506) is used to train multiple concurrent versions of the cognitive model (element 308) that represent different cognitive phenotypes (model instances with different parameters, and hence different cognitive operations, and different "thoughts"). These cognitive models (element 308) all contain the instance based learning mechanism in the cognitive architecture so that each interaction between the bot and the actual attacker is learned over time. Since the cognitive models (element 308) can be utilized as a forecast of what the attacker will do, the actual responses of the attacker from historical interactions can be utilized as a ground truth to select which model best represents the actual attacker over time. One skilled in the art can utilize a number of different methods for this matching process, such as utilizing the L2 norm error (Euclidean error) of a metric for distance between the cognitive model response and attacker actual response is quantified. The output (element 508) represents the output of this matching process evolving over time as the probability of the cognitive profile, where the probabilities for each cognitive profile (a unique instance of a cognitive model of the attacker) are computed.

The CM (element 308) simulates multiple cognitive profiles (element 504) in CHESS and learns from its online interactions and converges to the optimal match over time. The GT module (element 306) can forward-simulate the local bot's (element 300) action to determine its outcome on the attacker (element 301), including their cognitive profile. The cognitive profile (element 504), along with associated probability (see FIG. 5B), is sent to the GAN (element 310) for forward-simulation of the attacker's action to allow the global bot GT module (element 306) to fully explore the strategy space to elicit information for a maximum retrieval rate.

The different CMs (element 308) enable CHESS to uniquely model the strategies, heuristics, and biases of different attackers, as shown with the probabilistic cognitive profile vector in FIG. 5B. The probabilistic cognitive profile vector represents the output (element 508), which represents a set of attacker types with varying levels of aggressiveness, trust on the victim, deceitfulness, depth of processing, cognitive overload, etc. The system described herein maps the current attacker to one of the known profiles to help CHESS prescribe the optimal strategy against that attacker with the specific cognitive profile. Cognitive architectures bring substantive additional constraints over cognitive mechanisms compared to agnostic machine learning techniques, but still require a limited amount of human data to account for free parameters such as individual differences in cognitive capacities, knowledge and strategies (see Literature Reference No. 12). In CHESS, human subject studies can be designed for neuropsychological tests and Active Social Engineering Defense (ASED) tasks to enhance the accuracy of the CM (element 308) and cognitive profiles (element 504). Cognitive models can then be used to generate much larger amounts of training data for analytic models, such as Markov networks including in conditions for which no human data exists (see Literature Reference No. 17). Finally, during deployment as each interaction occurs, the CMs (element 308) of the attacker are updated using ACT-R's instance based learning mechanism (see Literature Reference No. 18) to rapidly learn the current cognitive context of the specific interaction and obtain an individualized model. ACT-R has previously been used to create a collective of agent bots, which have explored locally and updated a global memory for coordination (see Literature Reference No. 19). In CHESS, the local bot CMs (element 308) will communicate to maintain and update global cognitive profile parameters (such as depth of processing) and local ones relevant to the game and victim (e.g., trust on the victim will be different for each local bot controller (element 300). As the interactions proceed, each local bot controller (element 300) improves its confidence on the cognitive profile.

(4.5) Generative Adversarial Networks (GAN) Module (Element 310)

Figure 6:
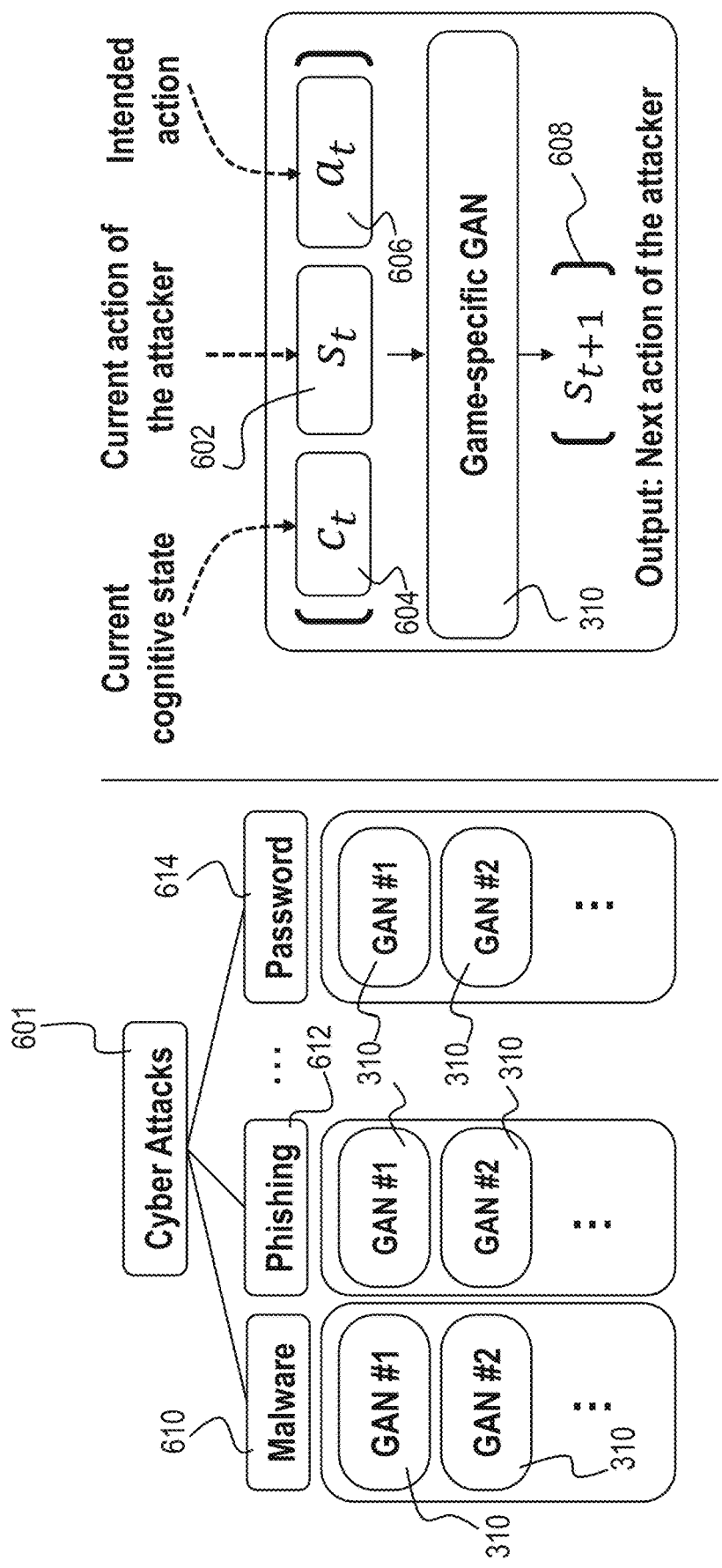
FIG. 6 is an illustration of CHESS utilizing a set of Generative Adversarial Networks (GANs), where GANs model state space of the games conditioned on the intended action and the cognitive state of the attacker according to some embodiments of the present disclosure.

The Generative Adversarial Networks (GANs) module (element 310) models the attacker's consequent actions. Literature Reference Nos. 20-23 provided detailed descriptions of GANs. FIG. 6 shows CHESS utilizing a set of GANs (element 310), where GANs (element 310) model state space of the games conditioned on the intended action of CHESS and the cognitive state of the attacker. Each game-specific GAN (element 310) comprises a neural network that is trained to model the next action of the attacker in a specific game. The set of all GANs spans the space of all games known to CHESS. The input to each game-specific GAN (element 310) is the current action of the attacker (element 602), the cognitive state of the attacker (element 604) as estimated from the CM module (element 308), and the intended action (element 606) of CHESS provided by the GT module (element 306). The game-specific GAN (element 310) then outputs the probability of potential next actions of the attacker (element 608). The choice of GANs (e.g., GAN #1, GAN #2) enables one to treat the problem as a regression problem and model state machines with potentially infinitely many states, empowering CHESS to deal with partially observed states and incomplete information. While it is impossible to create a separate GAN in advance for each attack type as attackers advance their skill sets to create an advanced attacked, the system according to embodiments of the present disclosure generates a new GAN by combining known GANs using partially observed attacker's state information.

(4.5.1) State Space of GANs

Figure 7:
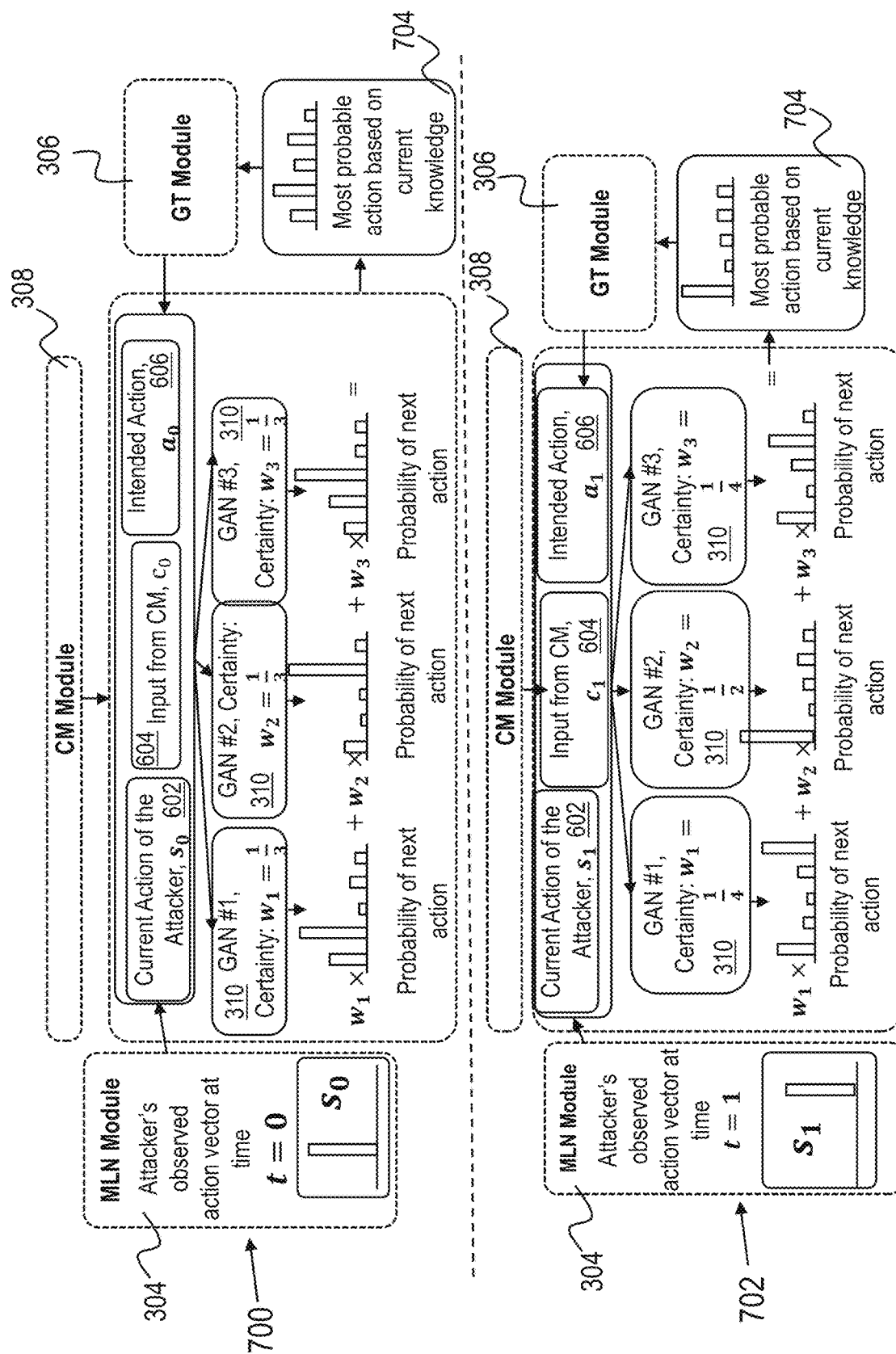
FIG. 7 is an illustration of each GAN predicting the probability of the attacker's next action according to some embodiments of the present disclosure.

The interactions between the victim and the attacker are modeled as a state-machine, where the state transition depends on the action (i.e. response of the victim) as well as the cognitive state of the attacker (e.g., aggressive, deceitful, biased). Depending on the type of the cyberattack (element 601) (e.g., malware (element 610), phishing (element 612), password (element 614)), each GAN (element 310) models one such state space and predicts the attacker's next action (i.e., next action of the attacker (element 608)), with respect to the victim's intended action (element 606) and the attacker's estimated cognitive state (element 604). Furthermore, it is assumed that the attack/game type is unknown; therefore, the GAN module (element 310) is required to simultaneously estimate the attack type and the most probable next action of the attacker (i.e., next action of the attacker (element 608)). The game type is estimated over time by comparing the actual observed action of the attacker with the previous predictions of the GANs (element 310). In short, the likelihood of a specific attack/game increases at time 't' if the prediction from its corresponding GAN (element 310) at time 't−1' matches the observed action of the attacker at time 't'. This concept is visualized in FIG. 7 for two consequent time steps, t=0 (element 700) and t=1 (element 702). FIG. 7 depicts each GAN (element 310) predicting the probability of the attacker's next action (element 608) conditioned on: 1) the type of attack/game (e.g., elements 610, 612, 614), 2) attacker's current action (element 602), 3) the current estimation of the attacker's cognitive state (element 604), and 4) victim's intended action (element 606). At the beginning of the interactions, the game type is unknown;

however, the likelihood of a specific game increases over time if the predicted action by its corresponding GAN matches the attacker's observed action. This mechanism effectively reduces the entropy of the perceived likelihood of the game type over time. The probabilities of the next action obtained from all of the GANs (element 310) are summed to obtain the most probable action based on current knowledge (element 704).

(4.5.2) Forward Simulation

The capability of obtaining an accurate estimation of the next action of the attacker (element 608) based on an intended action (element 606) enables CHESS to 'contemplate' on its intended actions by simulating potential outcomes of its action. Consequently, at a fixed time, t (element 700), the GT module (element 306) can optimize its actions based on the potential next actions of the attacker at time t+1 (element 702); this can potentially be extended in time so that CHESS can 'contemplate' on the outcomes of its actions T steps in the future, t+T.

(4.5.3) Training Phase

Each GAN (element 310) is trained over existing sets of interactions in played games (i.e., observed attacks). The loss function for training each GAN (element 310) consists of a cross-entropy minimization with an adversarial network that discriminates between the distribution of the predicted actions and the actual distribution of the actions. The training phase includes designing the neural architecture of each GAN (element 310), and a stochastic gradient descent optimization that minimizes the loss function.

(4.5.4) Continuously Evolving GANs for New, Unknown Attacks

Although the system according to embodiments of the present disclosure starts with a fixed set of known attacks/games, trained GANs (element 310), it updates its set of games in a lifelong learning setting. During deployment, and after each sequence of interactions with a new attacker, the GAN module continuously evaluates its GANs (element 310) to measure how well its knowledge captured the attacker's actions throughout the course of the interactions. For new, unknown types of attacks/games, the evaluations will be unsatisfactory, alerting the module to add the new observed attack to its set of known attacks. Given that the interactions (e.g., message exchange, including emails, SMSs, and phone conversations) with a new attacker only provide a small set of learning data, an evolutionary algorithm is used, and the GANs that were most successful in predicting the actions as parents are selected. Off-spring GANs are generated from their combination to obtain a GAN that models the observed new attack.

(4.6) Adaptive Behavioral Game Theory (GT) Module

Figure 8:
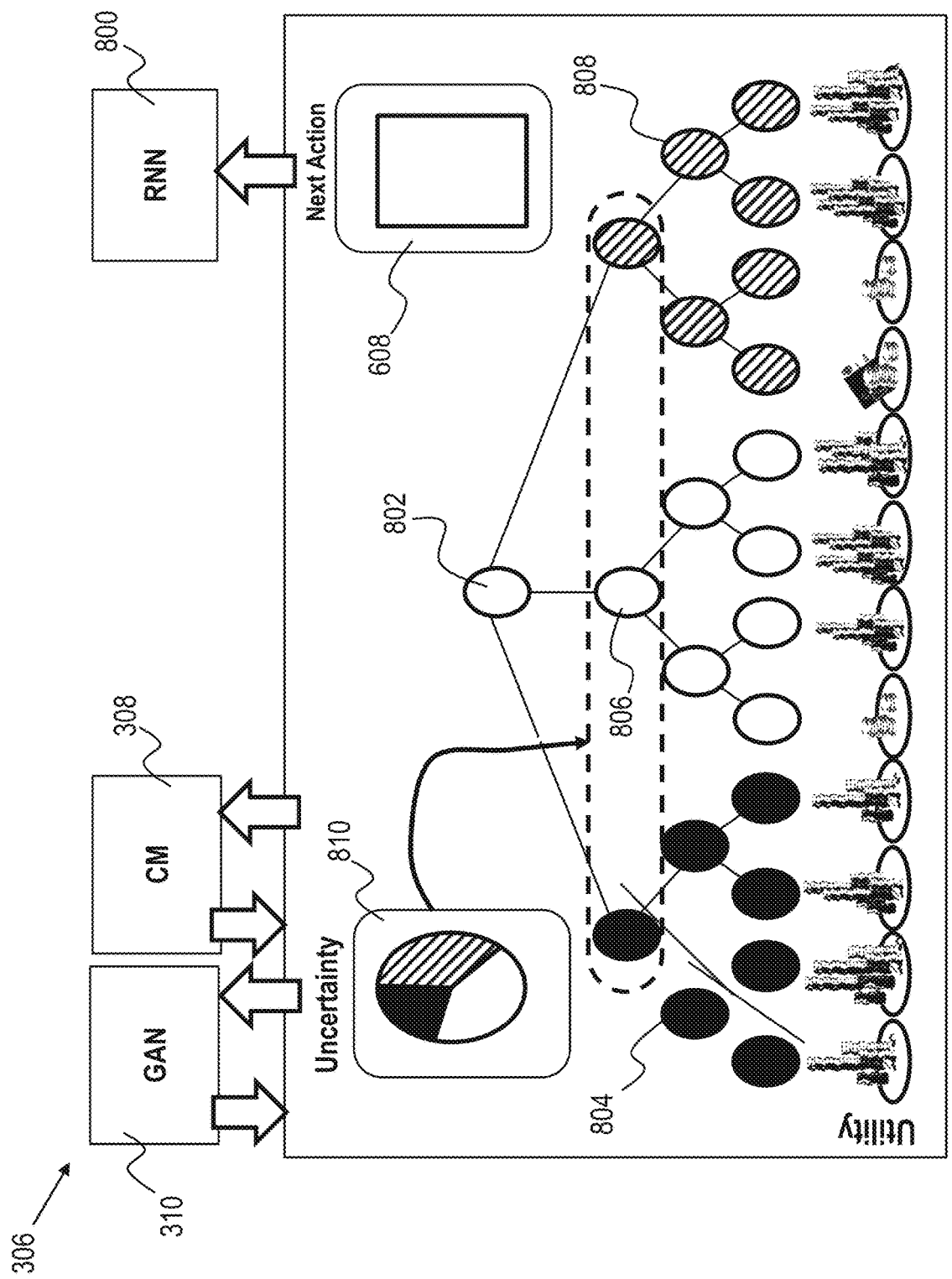
FIG. 8 is an illustration of a game theory (GT) module reasoning about the current state of the game using information from the GAN and the CM module, and selects the next action in the exchange with the attacker according to some embodiments of the present disclosure.

The Game Theory (GT) module (element 306) is responsible for deciding how to strategically interact with the attacker. FIG. 8 illustrates how the GT module (element 306) reasons about the current state of the game using information from the GAN (element 310) and CM (element 308), and selects the next action (element 608) in the exchange with the attacker, which is sent to a recurrent neural network (RNN) (element 800) that may be used for a human-readable dialog generation. Each circle (e.g., element 802) represents an action space. In the example shown in FIG. 8, given an attacker action on top (element 802), there are three potential actions that a victim can respond with, each with different shadings (elements 804, 806, and 808). The pie (element 810) represents the probabilities for each action space based on the outputs from GANs (element 310) and CM (element 308).

Operating in a state of uncertainty both with respect to the attacker's aims and abilities, the strategy produced by the GT module (element 306) will employ a combination of exploratory actions to reduce strategic uncertainty and exploitative actions to extract information and effort from the attacker. These strategies will utilize both consumable (e.g., resources) and non-consumable assets (e.g., dialog) to modulate the attacker's cognitive state and increase their likelihood of disclosing identifying information (e.g., attacker's email/financial/social media account information (username & password), citizenship, birthday, phone numbers, government identification numbers).

(4.6.1) Theoretical Framework

To capture the interaction between the system described herein and the attacker, the class of extensive form games with incomplete information is used. This class of games includes two key elements of the social engineering defense scenario: sequential interactions with the attacker and uncertainty about the current state of the game as it pertains to the attacker's intentions. Whereas this class of games has traditionally been studied in the context of a perfectly rational attacker, however, other needs require that the framework be extended to allow for more realistic and varied behavioral characteristics from the attacker. This behavioral challenge is compounded by the fact that an inherent uncertainty exists to determine exactly which behavioral type applies to a given attacker. The approach described herein overcomes these challenges by integrating a cognitive model of the attacker into a fictitious play learning algorithm, and then using subsequent interactions with the attacker to revise the behavioral model and update the strategy as needed.

(4.6.1) Strategic Response Prescription with Bot Coordination

Representing the "game" the system according to embodiments of the present disclosure as playing with the attacker presents another key challenge for two reasons. In an explicit representation of the extensive form game, decision trees grow exponentially with the duration (i.e., number of interactions) of the game. More importantly, it may not be entirely clear how to learn exactly which game the attacker has initiated. To overcome these challenges, the GAN (element 310) is used as a compact representation of the extensive form game tree. The GAN (element 310) will learn the structure of game(s) offline by using a corpus of training data of previous attacks from a variety of different attacker types and objectives. Then, when dealing with the current attacker, the GAN (element 310) will update the confidence associated with the current game state in an online fashion as the interaction with the attacker unfolds. With the reduction in strategic uncertainty provided by CM (element 308), GAN's (element 310) reduction in structural uncertainty will enable the GT module (element 306) to prescribe adaptive and increasingly effective actions against the attacker as the interaction plays out.

To complete the game's representation, a utility function must be specified. It is assumed that the game is constant-sum, so that the attacker's utility function is simply the disutility (i.e., inverse of the system's utility) incurred by the system described herein. For example, if the system described herein gains rewards/utilities, attackers lose the amount the system gains. The system's utility is modeled solely as a function of the rewards gained from the attacker, a quantity that is normalized to the unit interval. The precise form of such a utility function will be subject to the attack and attacker types for which training data is available, but will generally be increasing in both the amount of information obtained from and time/resources consumed by the attacker. GT (element 306) is in the global bot controller (element 302) to monitor and interact with each local bot controller (element 300) such that it can strategically assign the strategies to maximize the utility.

(4.7) Experimental Study

An embodiment of this invention was produced through experimental studies in a pilot study of a well-known adversarial game called Liar's Dice (see Literature Reference No. 19). Liar's Dice captures the basic nature of the social engineering attack setting as follows. Liar's Dice involves a variable, but bounded, number of iterative interactions between players, and each player has full information of one's own state and no initial knowledge of the opponent's. As the game continues, players gradually reveal information about one's own state, and face the constant possibility of calling the opponent's lies or continuing the game. Hence, Liar's Dice captures the fundamental challenges in social engineering defense of balancing the need to reveal some truthful information (to avoid being caught lying) with the dangers of revealing too much (giving away the game to the opponent).

(4.7.1) Game Description

Liar's Dice was modified to illustrate the core aspects and benefits of the system according to embodiments of the present disclosure in social engineering attacks. In this version, two players take a turn to roll a die. When the first player (P1) rolls a die, P1 makes a bid based on the face value of the die (from 1 to 6). The second player (P2) then rolls a die and makes the bid that must be higher than P1's bid to continue the game. Players have freedom to pick their own strategies, such that their bid does not need to adhere to the rolled die's face value. The game continues between P1 and P2 by repeating these steps until one of the two conditions are met: (1) One of the players (say P1) calls a bluff, indicating that the other player (say P2) may be lying. If P2 indeed lied, P1 wins the game; otherwise P2 wins the game; or (2) the current player cannot call a higher face value, in which case the previous player wins the game.

In ASED, attackers have a variety of game spaces: phishing vs. spear-phishing vs. scam, goal to steal money vs. sensitive information, etc. To apply the notion of playing different games, an option was added to make the die biased for the attacker. Moreover, the attacker can have different behaviors in calling a bluff, and two types of bluffing behavior were modeled: calling a bluff with 50% probability vs. 10%. The attacker can have a variety of bidding behaviors: based on the amount of bid incremented for each round (i.e., step increment), the attacker can be considered as one of the following: (1) aggressive if the probabilities are higher for larger step increments; (2) conservative if the probabilities are higher for smaller step increments; (3) uniform if the probabilities are uniformly distributed across all step increments. By varying these three variables of the attacker (i.e., die's bias level, bluffing behavior, and bidding behavior), the goal as a victim is to correctly identify the attacker type and win the game.

(4.7.2) Implications of Liar's Dice in ASED

In the game setting, the attacker winning a game by calling a bluff indicates that he/she notices the strategies and quits the game. If the attacker continues and loses the game, this result indicates that the victim successfully predicts the game environment of the attacker, namely die's bias level, bluffing behavior, and bidding behavior.

(4.8) Simulation Environment

In experimental studies, the goal of CM (element 308) is to predict an attacker's cognitive model, and GAN (element 310) attempts to predict whether or not the attacker will call the victim a bluffer.

(4.8.1) CM (Element 308)

Using ACT-R, the CM (element 308) plays liar's dice in a variety of conditions (e.g., 81 different ones, each repeated 10 times) in the role of the adversary. The model runs in model-tracing mode, making its own decisions but forced to follow the adversary's decisions in order to let the model learn from its decisions. Note that the CM (element 308) has no knowledge of the adversary internal organization and computations, and all model parameters are left at standard ACT-R values.

(4.8.2) GAN (Element 310)

A GAN (element 310) was trained to predict whether or not the attack will call the victim a bluffer. Input to the network is a four-dimensional vector including the previous bid, the intended current bid, and the cognitive input identifying attacker's aggressiveness for: 1) raising the bids, and 2) calling a bluff. A four-layer neural network with 8, 16, 8, and 2 neurons in corresponding layers was used, where the last layer is the Softmax probability estimation of the attacker's action. To mimic the unknown game scenario, three die types with different biases on the face values were selected, and a separate network was trained for each die type to predict the attacker's action. The networks were trained on 12,960 games using back-propagation to minimize the cross-entropy loss between the actual attacker's action and the predictions. The networks were tested on 3,240 unseen games to predict the attacker's actions.

(4.8.3) GT (Element 306)

Using the inputs from GAN (element 310) and CM (element 308)), liar's dice was run to measure how GAN's (element 310) prediction assists the GT module (element 306) in playing a better game to overcome the attacker's uncertainty. The mean difference was measured between the number of games that the victim wins and the number of games that the attacker wins with GAN (element 310) and without GAN (element 310) using 3,240 games.

(4.9) Experimental Study Results

Figure 9A:
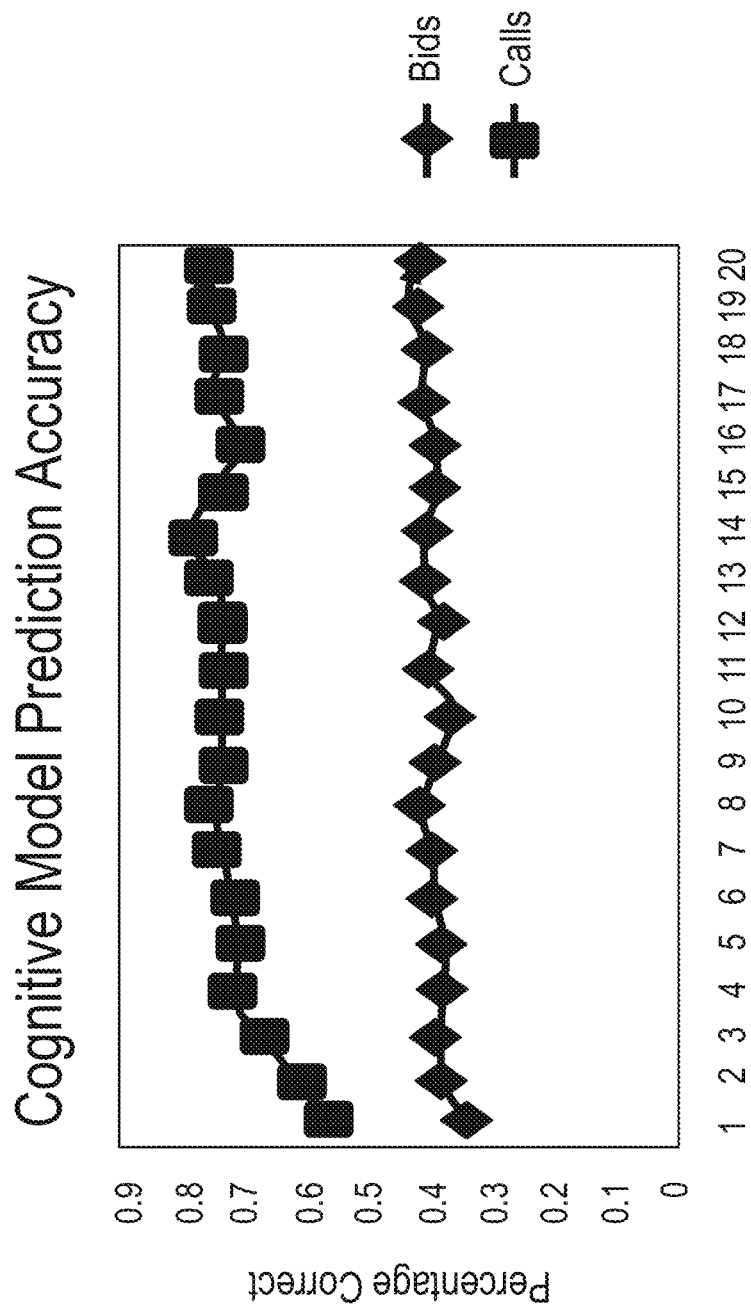
FIG. 9A is an illustration of experimental study results for the CM module's prediction accuracy of an attacker's bidding and calling behavior according to some embodiments of the present disclosure.

The experimental study for CHESS shows results for three of the CHESS modules involved in the forward simulation of a game that computationally models the social engineering attacks. FIG. 9A illustrates CM's (element 308) prediction accuracy of attacker's bidding and calling behavior. The cognitive model of the adversary was simulated and prediction accuracy was measured, comparing model and adversary decisions for both bids and calls. For bids (chance level: 17%), the model starts at 33% and ends at 42%, with an average performance of 38%. For calls (chance level, 50%), the model starts at 56% and ends at 75%, with an average performance of 71%. This gives CHESS a significant advantage in understanding the adversary, and simulating their cognitive profile and behavior.

Figure 9B:
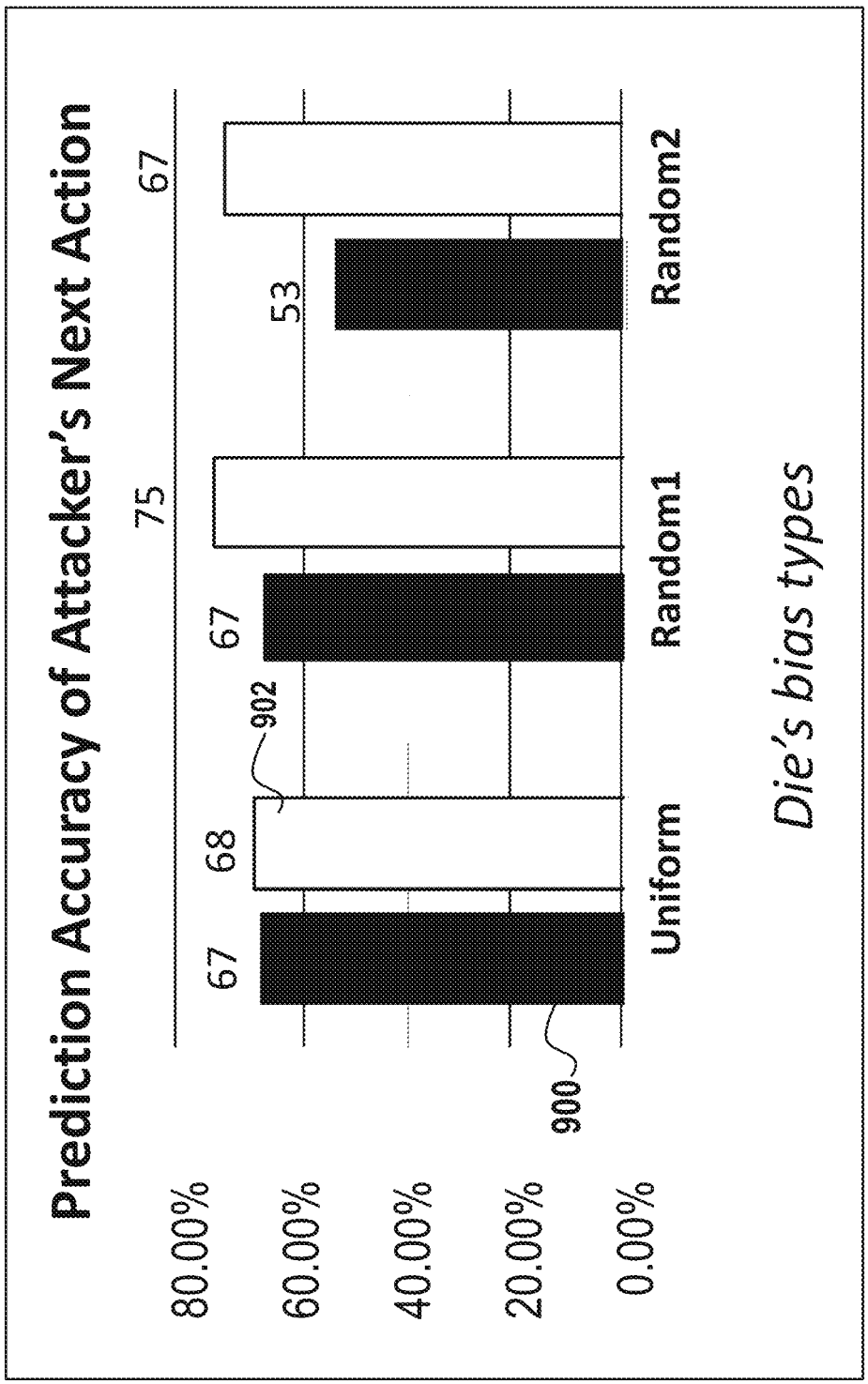
FIG. 9B is an illustration of experimental study results for the GAN's prediction accuracy in predicting the attacker's next action for three different die types according to some embodiments of the present disclosure.

FIG. 9B depicts GAN's (element 310) prediction accuracy in predicting the attacker's next action (y-axis) for 3 different die types (x-axis). The filled bars (e.g., element 900) indicate GAN's accuracy without CM (element 308), unfilled bars (e.g., 902) indicate GAN's accuracy with CM. FIG. 9B shows how the CM (element 308) benefits the GANs (element 310) forward simulation of the attacker's behavior; without CM (element 308), GAN (element 310) achieves on average 62.3% accuracy in predicting the attacker's action. With CM (element 308), GAN's (element 310) accuracy increases to 72.2% on average. Applying the results to the social engineering defense setting, increased accuracy in GAN (element 310) would help GT (element 306) prescribe strategies to increase the retrieval rate of the attacker's identifying information. Finally, the experimental study result using the GANs (element 310) information about the adversary for forward simulation increases the GT module's (element 306) win rate by 20%: the mean difference between the number of games that the victim wins and the number of games that the attacker wins with GAN (element 310) is 3.91, while the same mean difference without GAN (element 310) is 3.23.

The system described herein can be used to elicit information from attackers in order to, ultimately, disrupt social engineering attacks. Disruption of social engineering attacks can be achieved by mediating communications between users and potential attackers, and identifying the attacker. Attackers launch social engineering attacks with specific objectives/goals in mind. The system described herein disrupts the natural flow of the attacker's approaches to maximize both the amount of information that is learned about the attacker and the number of interactions in order to waste the attacker's time while minimizing attacker's goals being achieved.

For example, the goal of an attacker may be to get money from victims by generating, for instance, an email message requesting the money (i.e., message to victim (element 312 in FIG. 3)). Rather than following the attacker's plan and giving away the money, the system according to embodiments of the present disclosure provides an optimal strategy for each interaction to disrupt the attack, such as generating an email response (i.e., victim's response (element 314 in FIG. 3)) that the victim is having a difficult time connecting to the site to enter his/her bank information and instead asks to speak over the phone so that the victim can provide the bank information. With this strategy, the attacker may have to reveal his/her phone number, which can reveal some identifiable information about the attacker (e.g., country, state, connection to public records).

As another non-limiting example, an attacker aims at acquiring personally identifiable information from the victim (e.g., email, phone number, address) by sending a message to the victim (element 312 in FIG. 3). The system described herein can protect the victim by generating and transmitting a response (element 314 in FIG. 3) that the victim does not feel comfortable sending his/her personal information over email and, instead, attaches a document with the requested information on it. The attached document can have a hidden feature embedded within it to track the geolocation as soon as the attacker opens the document. Furthermore, if the attacker forwards the document to his/her colleagues, the location tracking information of the attacker's organization can be obtained.

Furthermore, vehicle and aircraft manufacturers can benefit from the present invention to provide enterprise-level risk management systems. In addition to fighting against spear-phishing and cyber espionage, a vehicle manufacturer can secure its in-vehicle safety and security system by using CHESS to identify social engineering attackers that attempt to bypass a call center and hack vehicles remotely. CHESS aims at eliciting identifiable information about the attacker such that law enforcement can chase them. Further, an aircraft manufacturer can secure its cockpit technologies against attackers that attempt to get their activities into airplanes. Attackers can attach malware on their messages, and if an unprotected employee opens the attachment, such malware can be penetrated to identify vulnerabilities to threaten the aircraft security. The system described herein can help enterprise and government organizations protect their proprietary information from attackers who constantly inject social engineering attacks on employees to extract proprietary information.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for continuously predicting and adapting optimal strategies for attacker elicitation, the system comprising:
   a global bot controlling processor unit in communication with one or more local bot controlling processor units, wherein each local bot controlling processor unit is specific for an attacker-victim relationship,
   wherein the global bot controlling processor unit comprises:
      a multi-layer network (MLN) software unit configured to extract attacker features from diverse, out-of-band (OOB) media sources;
      an adaptive behavioral game theory (GT) software unit configured to determine a best strategy for eliciting identifying information from an attacker; and
   wherein each local bot controlling processor unit comprises:
      a cognitive model (CM) software unit configured to estimate a cognitive state of the attacker and predict attacker behavior;
      a generative adversarial network (GAN) software unit configured to predict the attacker's strategies, wherein the GAN software unit comprises a set of GANs;
      wherein, in coordination, the global bot controlling processor unit and the one or more local bot controlling processor units are configured to predict the attacker's next action and use the prediction of the attacker's next action to disrupt an attack by the attacker,
      wherein the MLN software unit comprises a plurality of layers and nodes and edges within each layer, wherein each layer in the MLN software unit represents a distinct type of feature of the attacker,
      wherein the plurality of layers comprises a demographics feature layer, a topics of interest feature layer, and an intent feature layer,
      wherein identification of inter-layer links and intra-layer links in the MLN software unit are used to characterize the attacker's character, wherein intra-layer links indicate a similarity between features, and inter-layer links indicate a latent association among features.

2. The system as set forth in claim 1, wherein the GT software unit is configured to monitor and interact with each local bot controlling processor unit to assign strategies to maximize a utility gain of acquiring the attacker's identifying information.

3. The system as set forth in claim 1, wherein the CM software unit is configured to generate a plurality of cognitive profiles for the attacker and output the plurality of cognitive profiles to the GAN software unit.

4. The system as set forth in claim 1, wherein each GAN is a neural network trained to model the attacker's next action in a specific game, wherein input to each GAN is a current action of the attacker, the cognitive state of the attacker as estimated from the CM software unit, and an intended action, and wherein each GAN outputs a probability of a next action of the attacker.

5. The system as set forth in claim 1, wherein the one or more processors further perform an operation of transmitting a message to the attacker that aims to elicit identifiable information about the attacker in order to disrupt the attack.

6. A computer program product for continuously predicting and adapting optimal strategies for attacker elicitation, the computer program product comprising:
a non-transitory computer-readable medium having executable instructions encoded thereon, such that upon execution of the instructions by one or more processors, the one or more processors perform operations of:
using a multi-layer network (MLN) software unit of a global bot controlling processor unit, extracting attacker features from diverse, out-of-band (OOB) media sources, wherein the global bot controlling processor unit is in communication with one or more local bot controlling processor units, and wherein each local bot controlling processor unit is specific for an attacker-victim relationship,
using an adaptive behavioral game theory (GT) software unit, determining a best strategy for eliciting identifying information from an attacker;
using a cognitive model (CM) software unit of each local bot controlling processor unit, estimating a cognitive state of the attacker and predicting attacker behavior;
using a generative adversarial network (GAN) software unit of each local bot controlling processor unit, predicting the attacker's strategies, wherein the GAN software unit comprises a set of GANs;
using, in coordination, the global bot controlling processor unit and the one or more local bot controlling processor units, predicting the attacker's next action; and
using the prediction of the attacker's next action to disrupt an attack by the attacker,
wherein the MLN software unit comprises a plurality of layers and nodes and edges within each layer, wherein each layer in the MLN software unit represents a distinct type of feature of the attacker,
wherein the plurality of layers comprises a demographics feature layer, a topics of interest feature layer, and an intent feature layer,
wherein identification of inter-layer links and intra-layer links in the MLN software unit are used to characterize the attacker's character, wherein intra-layer links indicate a similarity between features, and inter-layer links indicate a latent association among features.

7. The computer program product as set forth in claim 6, further comprising instructions for causing the one or more processors to perform an operation of using the GT software unit, monitoring and interacting with each local bot controlling processor unit to assign strategies to maximize a utility gain of acquiring the attacker's identifying information.

8. The computer program product as set forth in claim 6, further comprising instructions for causing the one or more processors to perform operations of:
using the CM software unit, generating a plurality of cognitive profiles for the attacker; and
outputting the plurality of cognitive profiles to the GAN software unit.

9. The computer program product as set forth in claim 6, wherein each GAN is a neural network trained to model the attacker's next action in a specific game, further comprising instructions for causing the one or more processors to perform operations of:
inputting to each GAN a current action of the attacker, the cognitive state of the attacker as estimated from the CM software unit, and an intended action; and
outputting a probability of a next action of the attacker.

10. The computer program product as set forth in claim 6, further comprising instructions for causing the one or more processors to further perform an operation of transmitting a message to the attacker that aims to elicit identifiable information about the attacker in order to disrupt the attack.

11. A computer implemented method for continuously predicting and adapting optimal strategies for attacker elicitation, the method comprising acts of:
using a multi-layer network (MLN) software unit of a global bot controlling processor unit, extracting attacker features from diverse, out-of-band (OOB) media sources, wherein the global bot controlling processor unit is in communication with one or more local bot controlling processor units, and wherein each local bot controlling processor unit is specific for an attacker-victim relationship,
using an adaptive behavioral game theory (GT) software unit, determining a best strategy for eliciting identifying information from an attacker;
using a cognitive model (CM) software unit of each local bot controlling processor unit, estimating a cognitive state of the attacker and predicting attacker behavior;
using a generative adversarial network (GAN) software unit of each local bot controlling processor unit, predicting the attacker's strategies, wherein the GAN software unit comprises a set of GANs;
using, in coordination, the global bot controlling processor unit and the one or more local bot controlling processor units, predicting the attacker's next action; and
using the prediction of the attacker's next action to disrupt an attack by the attacker,
wherein the MLN software unit comprises a plurality of layers and nodes and edges within each layer, wherein each layer in the MLN software unit represents a distinct type of feature of the attacker,
wherein the plurality of layers comprises a demographics feature layer, a topics of interest feature layer, and an intent feature layer,
wherein identification of inter-layer links and intra-layer links in the MLN software unit are used to characterize the attacker's character, wherein intra-layer links indicate a similarity between features, and inter-layer links indicate a latent association among features.

12. The method as set forth in 11, further comprising an act of using the GT software unit, monitoring and interacting with each local bot controlling processor unit to assign strategies to maximize a utility gain of acquiring the attacker's identifying information.

13. The method as set forth in claim 11, further comprising acts of:
   using the CM software unit, generating a plurality of cognitive profiles for the attacker; and
   outputting the plurality of cognitive profiles to the GAN software unit.

14. The method as set forth in claim 11, wherein each GAN is a neural network trained to model the attacker's next action in a specific game, wherein the method further comprises acts of:
   inputting to each GAN a current action of the attacker, the cognitive state of the attacker as estimated from the CM software unit, and an intended action; and
   outputting a probability of a next action of the attacker.

15. The method as set forth in claim 11, wherein the one or more processors further perform an operation of transmitting a message to the attacker that aims to elicit identifiable information about the attacker in order to disrupt the attack.

* * * * *